United States Patent
Asayag et al.

(10) Patent No.: US 9,553,767 B2
(45) Date of Patent: Jan. 24, 2017

(54) HOST CONNECTIVITY TEMPLATES TO CONFIGURE HOST OF VIRTUAL MACHINES

(71) Applicant: Red Hat Israel, Ltd., Raanana (IL)

(72) Inventors: Mordechay Asayag, Netanya (IL); Michael Kolesnik, Ramat-Gan (IL); Lior Vernia, Tel-Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 171 days.

(21) Appl. No.: 14/188,971

(22) Filed: Feb. 25, 2014

(65) Prior Publication Data
US 2015/0244582 A1   Aug. 27, 2015

(51) Int. Cl.
*G06F 15/177* (2006.01)
*H04L 12/24* (2006.01)

(52) U.S. Cl.
CPC ......... *H04L 41/0843* (2013.01); *H04L 41/082* (2013.01)

(58) Field of Classification Search
CPC .................... H04L 41/082; H04L 41/0843
See application file for complete search history.

(56) References Cited

U.S. PATENT DOCUMENTS

| | | | |
|---|---|---|---|
| 5,838,918 A * | 11/1998 | Prager | H04L 41/0233 709/221 |
| 6,286,038 B1 | 9/2001 | Reichmeyer et al. | |
| 7,107,326 B1 | 9/2006 | Fijolek et al. | |
| 7,290,046 B1 | 10/2007 | Kumar | |
| 7,643,420 B2 | 1/2010 | Kwan et al. | |
| 8,005,013 B2 | 8/2011 | Teisberg et al. | |
| 8,326,953 B2 * | 12/2012 | Jin | H04L 41/0803 709/206 |
| 8,359,380 B2 | 1/2013 | Heim | |
| 2009/0241116 A1 | 9/2009 | Mullin | |
| 2009/0327462 A1 | 12/2009 | Adams et al. | |
| 2010/0088497 A1 * | 4/2010 | Bunin | G07F 17/323 713/1 |
| 2010/0100611 A1 | 4/2010 | Hatasaki et al. | |
| 2011/0010691 A1 * | 1/2011 | Lu | G06F 11/3688 717/124 |
| 2011/0022694 A1 * | 1/2011 | Dalal | H04L 41/0843 709/222 |
| 2012/0042069 A1 | 2/2012 | Hatasaki et al. | |
| 2014/0297871 A1 * | 10/2014 | Iikura | H04L 47/783 709/226 |

OTHER PUBLICATIONS

"KVM-Kernel-based Virtualization Machine", Qumranet, white paper, 2006, 5 pages.
"Solid Ice: Connection Broker", Qumranet, Apr. 2008, 7 pages.
"Solid Ice: Overview", Qumranet, Apr. 2008, 15 pages.
"Solid Ice: Provisioning Manager", Qumranet, Apr. 2008, 5 pages.
"Solid Ice: Virtual Desktop Server (VDS)", Qumranet, Apr. 2008, 6 pages.

* cited by examiner

*Primary Examiner* — Mohamed Wasel
(74) *Attorney, Agent, or Firm* — Lowenstein Sandler LLP

(57) ABSTRACT

A system and a method are disclosed for configuring hosts of virtual machines. The system and method include receiving, by a management server, a network configuration of a first host, wherein the first host is associated with a network identified by a network label, storing the network configuration of the first host in a template record, in response to a request to configure a second host, determining if the second host is to join the network identified by the network label, and configuring the second host using the template record.

20 Claims, 7 Drawing Sheets

| NIC 206 | LOGICAL NETWORK 217 |
| NIC 207 | LOGICAL NETWORK 218 |
| NIC 208 | LOGICAL NETWORK 219 |
| POWER PROVISION | 10W |
| SECURITY LEVEL | 8 |

HOST CONNECTIVITY TEMPLATES TO CONFIGURE HOST OF VIRTUAL MACHINES

TECHNICAL FIELD

The present disclosure relates to network computing, and more specifically to methods and systems that manage the network configuration of hosts of virtual machines (VMs).

BACKGROUND

Virtualization in information processing systems allows for multiple instances of one or more operating systems to run on resources (or components) of a hosting computing device ("host"). Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while "host software" is software, such as a VMM, that runs outside of, and may or may not be aware of, the virtualization environment.

VM(s) may run on one or more hosts. Further, each of the VM(s) may run under a respective OS which may or may not be different from the OS of another VM. Resources of the one or more hosts may need to be configured for the VM(s). For example, the network interfaces (NICs) of the one or more hosts may be configured by a network administrator through a user interface.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2B is an example template of network configuration specification according to an implementation of the present disclosure.

DETAILED DESCRIPTION

Implementations of the disclosure include systems and methods that facilitate the configuration of NICs or network values of a host executing virtual machines (VMs). Instead of manually configuring NICs for each host—which tends to be time consuming and error-prone, implementations allow a user of the virtualization information system to automate the process of NIC configuration. In one implementation, existing configurations of hosts may be extracted and stored in templates. Each template may be used to configure NICs of one or more hosts of VM(s). In this way, the time to configure NICs (or network parameters) may be significantly reduced. In another implementation, networks of hosts may be extracted and marked with labels. Thus, when a new host is added to the network, NICs of the new host may be configured using labels of existing hosts. In this way, the time to configure NICs or network parameters may be further reduced.

Techniques for network discovery and configuration for NICs of one or more hosts of VM(s) are described herein. In the following description, numerous details are set forth to provide a more thorough explanation of the implementations. It will be apparent, however, to one skilled in the art, that implementations of the present invention may be practiced without these specific details. In other instances, well-known structures and devices are shown in block diagram form, rather than in detail, in order to avoid obscuring implementations of the present invention.

As described above, in order to configure a network interface of one or more hosts, a network administrator typically may need to set up certain configuration values for each network interface of the hosts to match physical connections of the hosts to the network. To configure a large number of hosts, this manual process can be cumbersome and error prone, especially when the hosts can be coupled to multiple networks via separate physical network interface cards (NICs), where each NIC may be coupled to a different physical or logical network.

Implementations of the present disclosure include a method. The method includes receiving, by a management server, a network configuration of a first host, wherein the first host is associated with a network identified by a network label, storing the network configuration of the first host in a template record, in response to a request to configure a second host, determining if the second host is to join the network identified by the network label, and configuring the second host using the template record.

Figure 1:
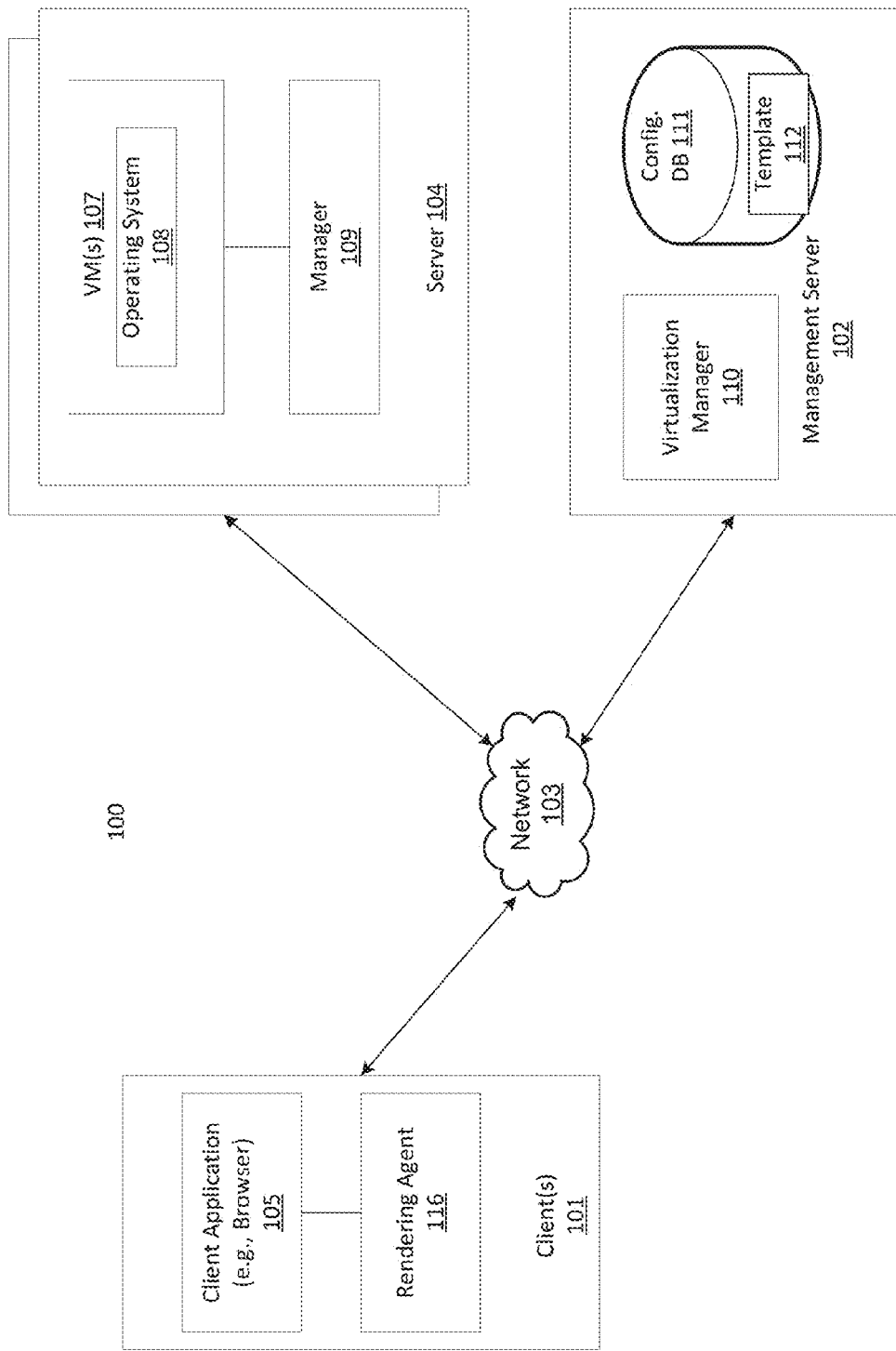
FIG. 1 is a block diagram illustrating a virtualization computing system according to an implementation of the present disclosure.

FIG. 1 is a block diagram illustrating a virtualization computing system 100 according to an implementation of the disclosure. Referring to FIG. 1, the system 100 may include, but not be limited to, one or more clients 101 communicatively coupled to a remote server or a cluster of hosts 104 over a network 103. Hosts 104 may represent an independent machine. Network 103 may be a local area network (LAN) or a wide area network (WAN) and may be a combination of one or more networks. Client 101 can be any computer system in communication with server 104 for remote execution of applications at hosts 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one implementation, server 104 is to host one or more virtual machines 107, each having one or more desktop applications 108 (e.g., desktop operating system). Desktop applications may be executed and hosted by operating system 108 within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows® operating system from Microsoft and a host OS may be a Linux® operating system available from Red Hat Inc.

Host server 104 may be managed by a management server 102, which may be a separate machine or part of server 104 (e.g., virtual desktop server or VDS). For example, server 104 may be implemented as a VDS server while management server 102 may be implemented as a VDC (virtual desktop control) server.

In one implementation, server 104 may be a member of a cluster of servers, where each of the member servers of the same cluster is coupled to the same network or the same segment of a network, also referred to as a logical network. Thus, a logical network may represent part or whole of a network. In one implementations, server 104 may include multiple network interfaces (not shown), which may be coupled to the same or different logical network. Each network interface of server 104 may be configured via management server 102 to one or more networks or logical networks.

In one implementation, given a logical network, the network discovery of the first host coupled to the logical network may be manually determined by a network administrator. The network configuration information or values may be stored in configuration database 111. However, any host that is subsequently coupled to the same logical network may be at least in part automatically configured by manager 110 using certain network parameters that are automatically obtained (e.g., learned via manager 109) from an existing host in the network and/or stored in configuration database 111. The network parameters may include IP addresses of the network and/or sub-network. As a result, the network administrator does not have to repeat the same manual network configuration process for the additional hosts to be coupled to the network.

In one implementation, the extracted network configuration information may be stored in a in a template record 112 on the configuration database 111 of the management server 102. Template record 112 may include mapping between NICs and network/logical networks. Additionally, template record 112 may also include power management parameters and security parameters that may be useful to configure NICs on the host.

Figure 2A:
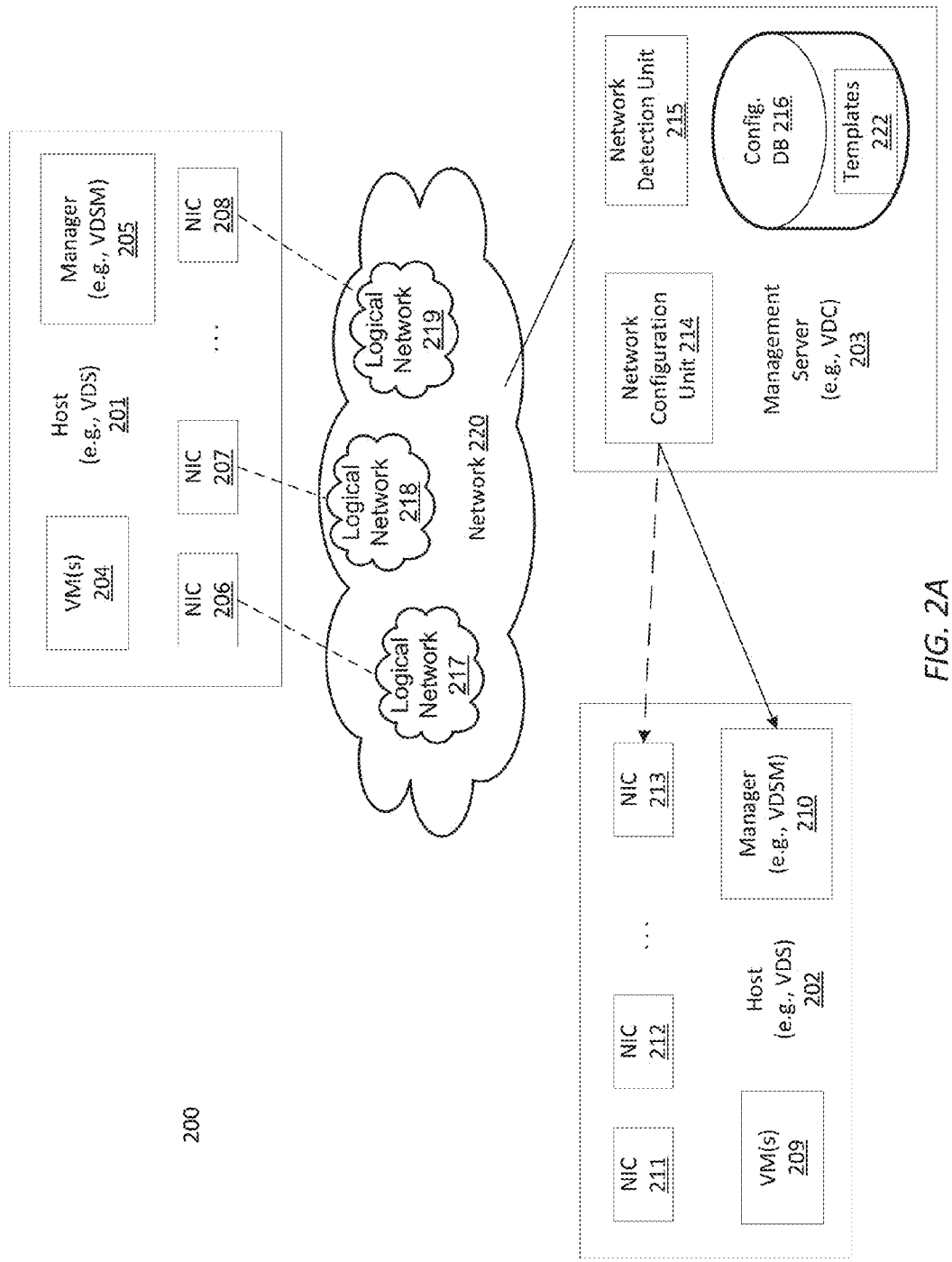
FIG. 2A is a block diagram illustrating an example of a network configuration according to an implementation of the present disclosure.

FIG. 2A is a block diagram illustrating an example of a network configuration according to an implementation of the disclosure. For example, hosts 201-202 may be implemented as part of a cluster associated with server 104 (e.g., VDS) and server 203 may be implemented as part of server 102 (e.g., VDC) of FIG. 1. Referring to FIG. 2A, hosts 201-202 and management server 203 may be communicatively coupled to each other over network 220. Each of the hosts 201-202 may include one or more network interfaces (also referred to as network interface cards or NICs) and host one or more VMs. In this example, host 201 includes NICs 206-208 and hosts one or more VMs 204. Each NIC may be associated with one or more VMs hosted by host 201. Similarly, host 202 includes NICs 211-213 and hosts one or more VMs 209. Each of the NICs is coupled to one or more logical networks that are detected by network detection unit 215 and configured by network configuration unit 214 of management server 203.

In this example, NIC 206 is coupled to logical network 217; NIC 207 is coupled to logical network 218; and NIC 208 is coupled to logical network 219. Each of the logical networks 217-219 is associated with a network identifier (e.g., network name) that identifies the respective network. Note that multiple NICs may be coupled to the same or different logical networks dependent upon a specific network configuration. Similarly, a single NIC may be coupled to multiple logical networks. According to one implementation, after a first host in a network has been detected and configured by a network administrator via server 203, a subsequent host entering the same network can be at least partially automatically configured by server 203 using similar network configuration information obtained from an existing host, which may be stored in configuration database 216.

For the purposes of illustration, it is assumed that host 201 is an existing host configured by server 203 where NICs 206-208 are communicatively coupled to logical networks 217-219 respectively. In one implementation, manager 205 (e.g., VDS manager or VDSM) is configured to broadcast a message (also referred to as a discovery message) in each of the networks 217-219 via a respective one of NICs 206-208. In one implementation, manager 205 may broadcast a discovery message in network 217 via NIC 206, where the discovery message includes at least a network identifier (ID) identifying network 217 and identifiers of NICs that are coupled to network 217.

In one implementation, other parameters of host 201 may also be manually configured and then extracted by manager 205 (e.g., at the direction of a network administrator) to be used to configure other hosts (such as host 202). The parameters may include power management parameters. For example, each host machine may be assigned with a power provision and power metering. The power usage by the host machine may be limited by the power provision parameter and monitored by the power metering parameter. These power parameters may be extracted from host 201 and used to set the power parameters of host 202. The power parameters may include a power limit that the host may consume. In the event that the host reaches the power limit, an agent (such as a fencing agent) may automatically turn off the host. Additionally, security setting (such as password requirement and safety level) of host 201 may also be extracted and used to set host 202. The security settings may include password and/or Secure Shell (SSH) key to install the host.

In one implementation, the configuration parameters extracted from a host (such as shot 201) may be stored in a template record 222 that may be stored in configuration database 216. The configuration parameters may include one of more of an identification of the host, network identifications for networks attached to the NIC, a boot protocol, and quality of service (such as minimum, peak, and average bit rates). If necessary, the configuration parameters for a NIC may also include bonding information of slaves and masters (the name of a master for a slave, or the name of a slave for a master). For example, a table 224 as shown in FIG. 2B may be part of the template record 222, where the table 224 may include a first column that specifies configurable parameters of host 201. For example, the configurable parameters of host 201 may include NIC configurations, power configuration, and security configuration. Table 224 may include a second column that specifies the mappings to logical networks, and/or parameter values. For example, NICs of host 201 may be mapped respectively with logical network 217-219 of network 220. In one implementation, the logical networks may be identified by their respective IP address. Power parameters (such as provision) and security levels may also be assigned with parameter values. These configurations and their corresponding parameters may be stored in template record 222 in the configuration database 216 to be used to set other hosts. In one implementation, after the configurations of host 201 are extracted and stored in template 222, a user may review and/or update the configuration through a user interface of management server 203.

Template record 222 that includes the configuration parameters extracted from host 201 may be used to configure other hosts (such as host 202). Thus, instead of manually setting each host of a cluster of hosts, the network configuration unit 214 may automatically set the configurations of other host using the configuration parameters contained in the template record 222. For the purpose of illustration, it is assumed that host 202 is also a member of the same cluster associated with host 201. Generally, network interfaces of hosts in the same cluster may be coupled to the same network or same network segment (e.g., logical network) and may have similar configuration parameters. In one implementation, when a new host 202 is added to network 220, network configuration unit 214 may determine if host 202 is part of the same cluster as host 201. For example, the network configuration unit 214 may retrieve cluster IDs associated with the incoming host and the existing host, and compare the cluster Ids to determine if they are in the same cluster. In response to a determination that they are in the same cluster, network configuration 214 may retrieve the configuration template 222 that was previously extracted from host 201 and transmit to manager (e.g., VDSM) 210 which may configure host 202 in view of configuration parameters stored in template 222.

In another implementation, network configuration unit 214 of management server 203 may directly configure components of host 202 in view of template 222. For example, network configuration unit 214 may configure NICs 211-213, and their power and safety configurations in accordance with the configuration parameters in template record 222.

When a new host entering the network or a cluster of hosts, network configuration unit 214 may select a template record out of the existing template records for the newly entered host in accordance with certain criteria. The criteria may include the hardware type of the new host, the physical network connections of the new host, and the cluster that the new host belongs to. For example, the new host may be configured using profiles of hosts that have the same network interfaces, or using profiles of hosts that belong to the same cluster of hosts.

In one implementation, multiple hosts may be configured using the template record 222 (e.g., as shown in FIG. 2B) extracted from host 201. For each of the hosts that should be configured like host 201, management server 203 may perform configurations using the template record 222.

Figure 3:
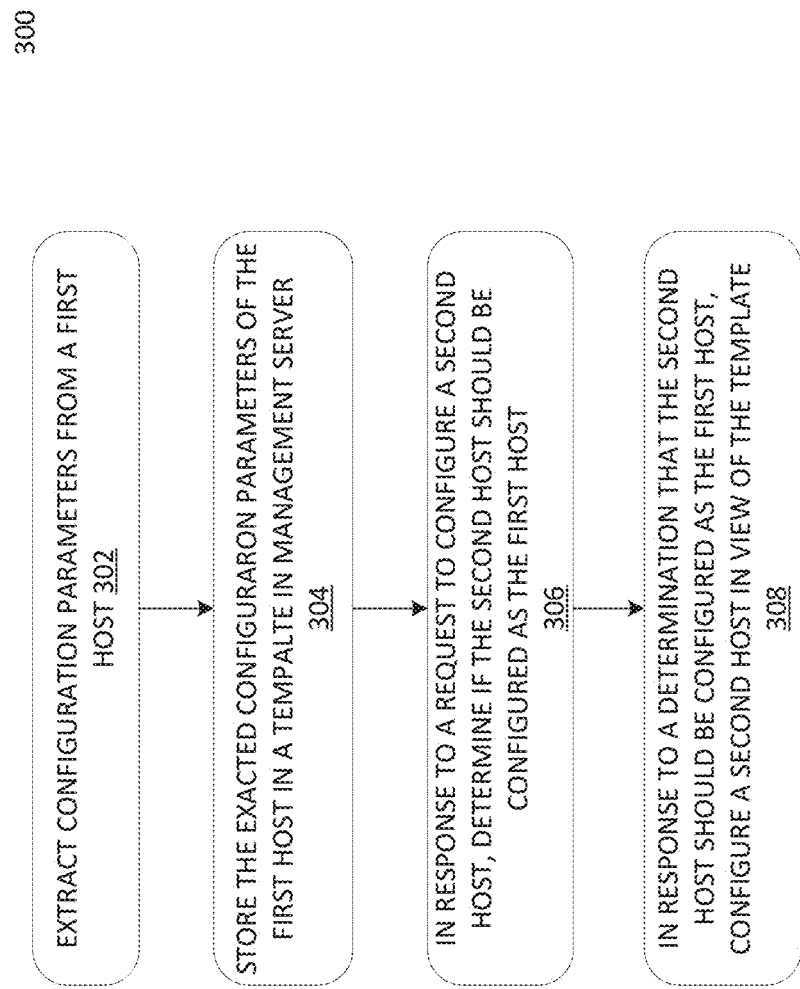
FIG. 3 shows a flow diagram illustrating an example of a method to configure NICS of a host according to implementations of the present disclosure.

FIG. 3 shows a flow diagram illustrating an example of a method 300 to configure networking of host machines according to implementations of the present disclosure. Method 300 may be performed by a processing logic that may include hardware (e.g., circuitry, dedicated logic, programmable logic, microcode, etc.), software (e.g., instructions run on a processing device to perform hardware simulation), or a combination thereof. In one example, method 300 may be performed by management server 203 as shown in FIG. 2A.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, at 302, a network detection unit of the management server 203 may extract configuration parameters from an existing first host of virtual machines (VMs). The first host may have been previously configured. The configurations of the first host may include mapping network interface cards (NICs) of the first host to IP addresses of logical networks of a physical network, power management parameters, and safety parameters.

At 304, the management server may store the extracted configuration parameters of the first host in a template record. The template record may include configurable parameters of the host and their corresponding parameters. In one implementation, the configurable parameters may include the parameters of NICs, power management parameters, and safety parameters. The management server may store the template record as a file in a configuration database of the management server. In one implementation, the stored template record may be identified and associated with an identification of the first host. In one implementation, a user (such as the administrator of the VM) may further edit and update the template using a user interface of the management server. The template in the extracted or edited form may also be used to configure other hosts.

At 306, the management server may receive a request to configure a second host. The request may be generated because the second host is to be added to the cluster of hosts. In response to receiving the request, a network configuration unit of the management server may determine if the second host should be configured using the configuration parameters of the first host in view of criteria such as whether the first and second hosts are in the same cluster of hosts. In one implementation, hosts within a same cluster as the first host may be configured using the template extracted from and associated with the first host.

At 308, in response to a determination that the second host should be configured as the first host, the network configuration unit of the management server may directly configure components of the second host using the profile of the first host. For example, the network configuration unit may configure NICs of the second host using the configuration parameters extracted from the first host and stored in the template record. In another implementation, the network configuration unit of the management server may transmit the template associate with the first host to a manager (VDSM manager) of the second host. The manager of the second host may configure components of the second host in view of the configuration parameters stored in the template record (such as those shown in FIG. 2B). In this way, the configuration of the second host may be automated without the time-consuming process of manual configuration of each new host.

The process to configure hosts may be further simplified using network labels. A network label may be an alpha-numerical string that may identify a network. Thus, a network label may be a name associated with the network. The network label may be used to label logical networks and network interfaces of hosts of virtual machines (VMs). Therefore, the usage of network labels may avoid the direct mapping of a NIC to an IP address of a network. Instead, the host network configurations can be achieved by manipulating the network labels. In this way, the operation to label a logical network may cause all network interfaces (NICs) which have been tagged with the network label to the logical network, and the operation to remove a network label from the logical network may trigger the removal of all NICs that are tagged with the network label from the network. In this way, network labels may be used to further simplify the network configuration process.

Figure 4:
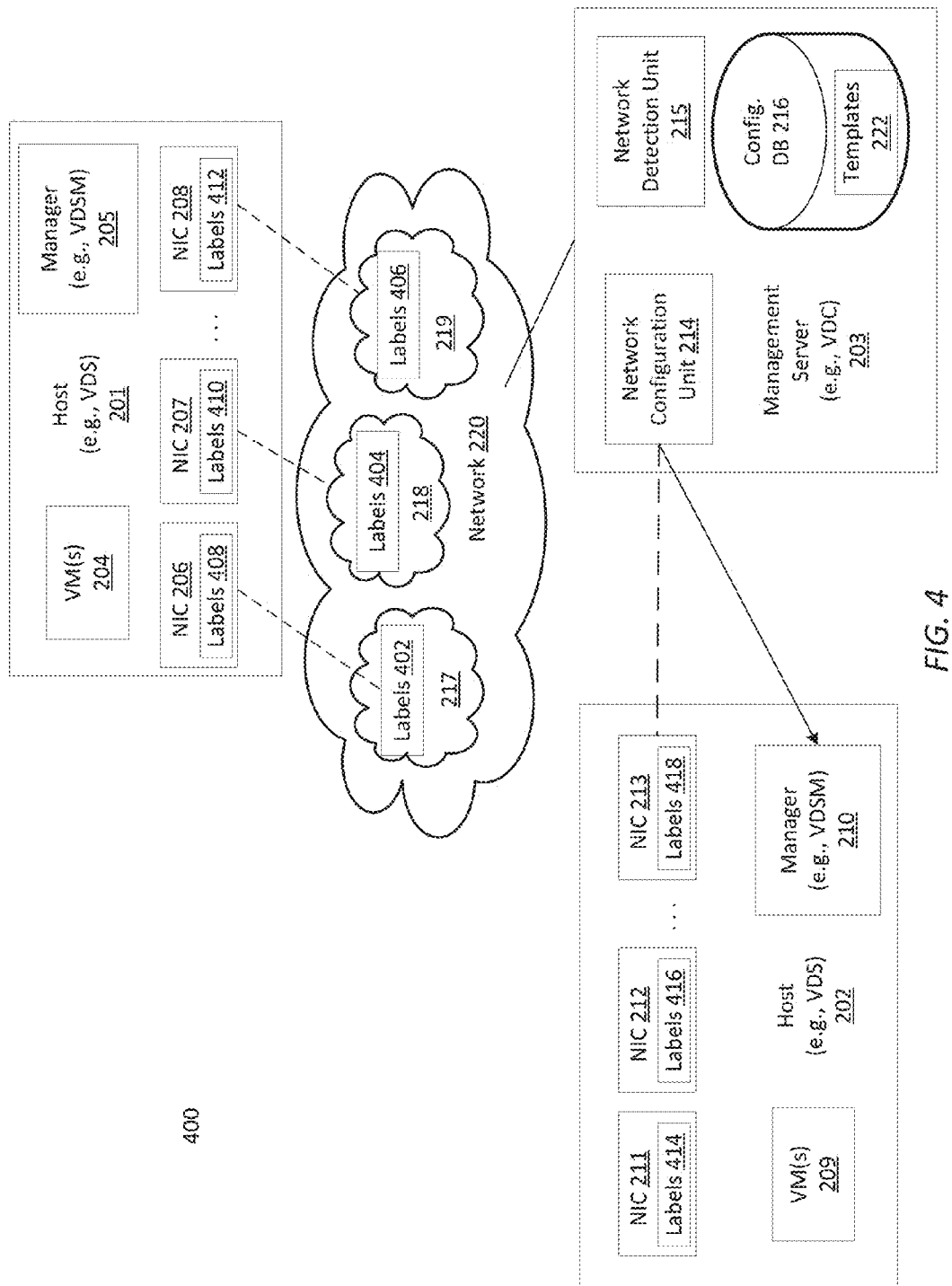
FIG. 4 is a block diagram illustrating a virtualization computing system using network labels according to another implementation of the present disclosure.

FIG. 4 is a block diagram illustrating a virtualization computing system 400 using network labels according to another implementation of the disclosure. In one implementation, a network label is a parameter that can be assigned to logical networks 217-217 (labels 402-406), and NICs 206-208 (labels 402-406) of host 201 and NICs 211-213 (labels 414-418). Each logical network may be associated with one or more network labels. Similarly, each NIC of hosts may be associated with one or more network labels. In one implementation, the network labels of NICs are allowed only for physical network interfaces (NICs).

In one implementation, the network labels may be used in the context of clusters. Thus, a logical network can be attached to a host only if the host is assigned to a cluster of networks. For example, Network 402 and 404 labeled with "NL"
Network 402 is assigned to a cluster 'A' and 'B'
Network 404 is assigned to cluster 'B'.

In the context of cluster A, the label NL represents only network 402. However, in the context of cluster B, label NL represents both network 402 and 404. In the event that network 404 is assigned by management server 203 to be coupled to hosts in cluster A, label NL may stand for network 404 as well as for network 402. The assignation of network 402 to cluster A may trigger all of the NICs in the cluster that are labeled with NL to be configured to communicate with network 402. In one implementation, all of the NICs in the cluster that are labeled with NL to be configured with the IP address of network 402. Removal of network 404 from cluster B of hosts may likewise trigger the decoupling between network 404 and all of NICs in the cluster.

In one implementation, when the NICs are the first to be labeled and later on a logical network is labeled with the same network label, execution of an "Assign Network to Cluster" command may trigger the attachment of the logical network to all of the hosts carrying that network label on their NICs. In one implementation, this attachment may be achieved by configuring the NICs carrying that network label with the IP address of the logical network. In another implementation, when the logical network is labeled prior to labeling the NICs, the labeling of the NICs may be set up according to the network labels of other existing hosts.

In one implementation, NICs of a first host (such as host 201) may be first configured with network labels 408-412. The network labels 408-412 of NICs 206-208 of host 201 may be matched with one or more network labels 402-406 of network 220. Subsequently, network detection unit 215 of management server 203 may extract the configurations of host 201. Instead of configuring NICs 206-208 with the IP addresses of logical networks, the configurations of host 201 may be achieved using network labels because the network labels associated with NICs 408-412 of host 201 may represent the network configurations of host 201. Further, the network configurations of host 201 in the form of network labels may be stored in a template record 222 that is associated with host 201.

In the even that a new host (such as host 202) is added to the network and needs to be configured, the network configuration unit 214 of management server 203 may first determine if the new host should be configured like the existing host 201. The determination may be in view of whether the new host is in the same cluster as host 201. If they are in the same cluster, the new host may be configured with configuration parameters as used in host 201. In one implementation, network configuration unit 214 may retrieve the template record 222 associated with host 201 (including network labels) and directly assign network labels as used by NICs 206-208 of host 201 to NICs 211-213 of host 202. The assignment of network labels to NICs 211-213 may trigger the mapping of NICs 211-213 to logical networks of the same labels. In another implementation, network configuration unit 214 may retrieve the template record 222 and transmit the template record 222 to manager 210 of host 202. Manger 210 may assign network labels of NICs 211-213 using the network labels stored in template record 222. Once NICs 211-213 of host 202 are assigned with network labels, they may be mapped to logical networks of the same labels. In this way, the process of configuring hosts may be further simplified.

Figure 5:
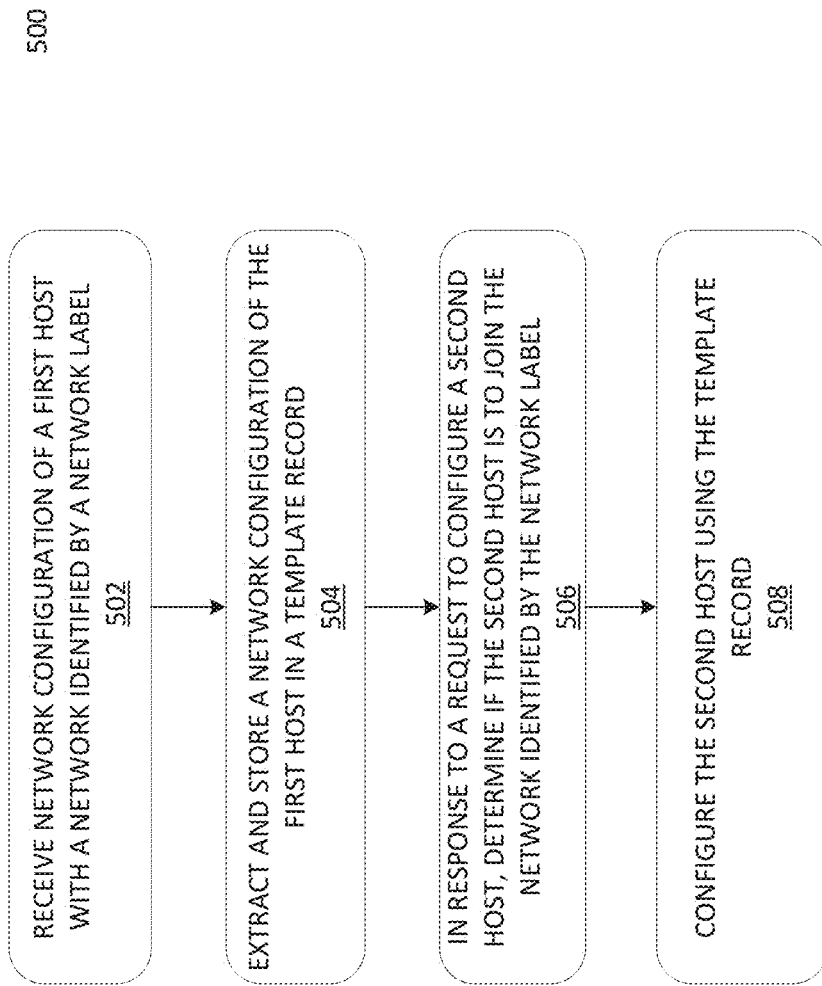
FIG. 5 shows a flow diagram illustrating an example of another method to configure NICs of a host using network labels according to implementations of the present disclosure.

FIG. 5 shows a flow diagram illustrating an example of a method 500 to configure networking of host machines using network labels according to implementations of the present disclosure. Method 500 may be performed by a processing logic that may include hardware (e.g., circuitry, dedicated logic, programmable logic, microcode, etc.), software (e.g., instructions run on a processing device to perform hardware simulation), or a combination thereof. In one example, method 500 may be performed by management server 203 as shown in FIG. 4.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 5, at 502, a network detection unit of the management server 203 may receive a network configuration of an existing first host of virtual machines (VMs). A network associated with the first host may be identified by a network label. The network configuration of the first host may include configurations of NICs of the first host and parameters such as power management parameters and safety parameters to configure the first host.

At 504, the management server may store the received network configuration of the first host in a template record. Thus, the template record may contain parameters of NICs (such as network names attached to NICs) of the first host and their corresponding values, and further the template record may additionally include configurable parameters (such as power management parameters and safety parameters) of the host and their corresponding configuration parameters. The management server may store the template record in a configuration database of the management server. In one implementation, the stored template record may be identified and associated with an identification of the first host. A user (such as the administrator of the VM) may further edit and update the template using a user interface of the management server. The template in the extracted or edited form may also be used to configure other hosts.

At 506, the management server may receive a request to configure a second host that is to join the network identified by the network label. The request may be generated because the second host is to be added to the cluster of hosts that are managed by the management server. In response to receiving the request, a network configuration unit of the management server may determine if the second host should be configured according to the first host.

At 508, in response to a determination that the network label associated with the second host matches the one associated with the first host, the network configuration unit of the management server may configure components of the second host using the parameter values stored in the template record. In this way, the configuration of the second host may be further automated using network labels.

Figure 6:
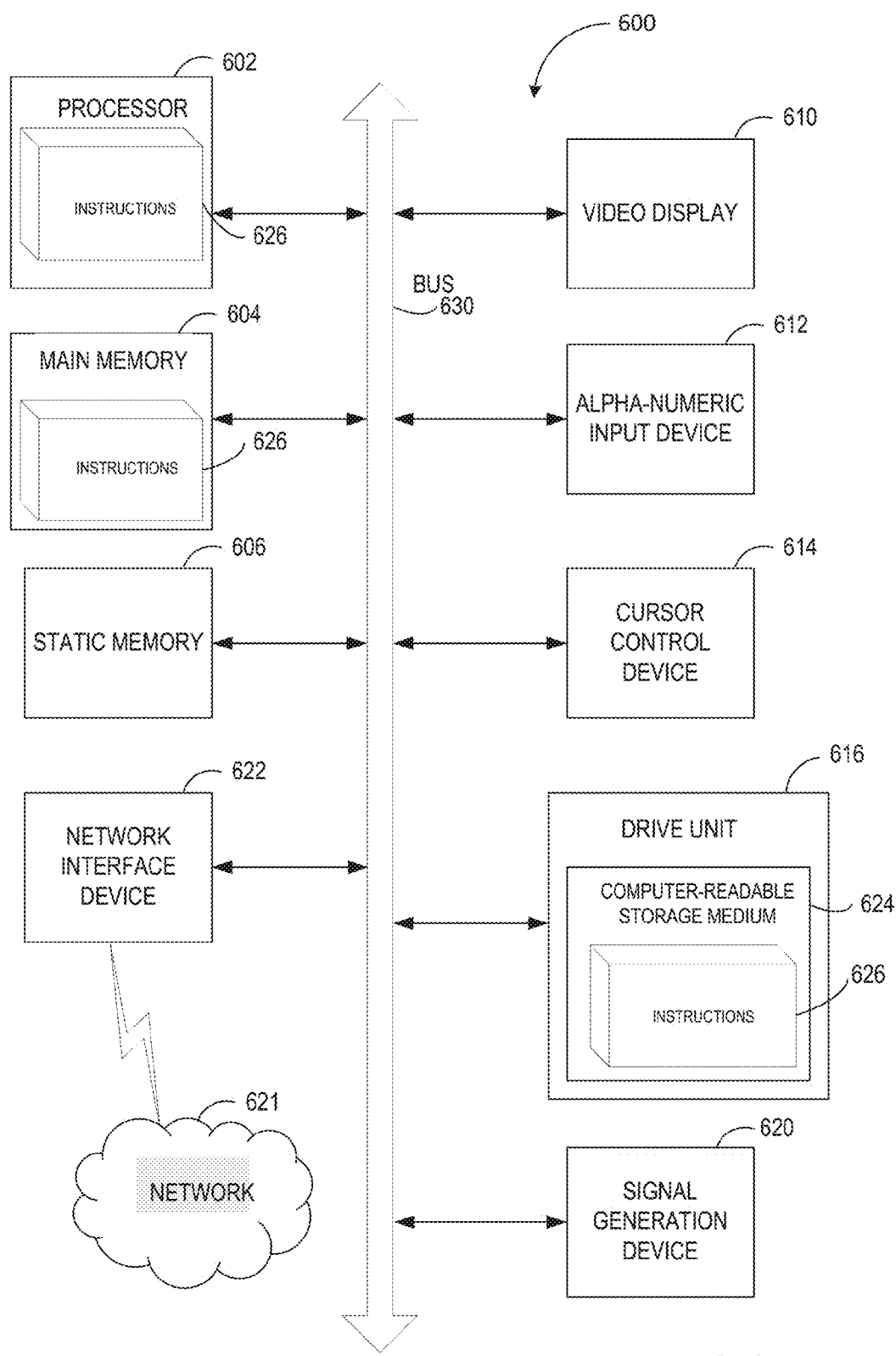
FIG. 6 shows a diagrammatic representation of a machine in the form of a computer system, in accordance with one example.

FIG. 6 depicts a diagrammatic representation of a machine in the form of a computer system 600 within which a set of memory instructions 626, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processor 602 (e.g., a processing device), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the operations for the core dump-level stack trace subsystem 120 for performing steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the core dump-level stack trace subsystem 120) for the computer system 100 representing any one or more of the methodologies or functions described herein. The instructions 626 for the computer system 100 may also reside, completely or at least partially, within the main memory 604 and/or within the processor 602 during execution thereof by the computer system 600, the main memory 604 and the processing device 602 also constituting computer-readable storage media. The instructions 626 for the computer system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving, by a management server, a network configuration data of a first host, wherein the first host is associated with a network segment identified by a network identifier, and wherein the network segment is a part of a cluster identified by a cluster identifier;
storing the network configuration data in a template record;
receiving a request to configure a second host;
determining that the second host is allowed to join the network segment in view of the cluster identifier;
configuring, by a processing device of the management server, the second host using the template record; and
joining the second host to the network segment.

2. The method of claim 1, wherein the network identifier comprises an alpha-numeral string.

3. The method of claim 1, wherein the network configuration data stored in the template record comprises a configuration data associated with a network interface card (NIC) of the first host.

4. The method of claim 3, wherein the configuration data associated with the NIC comprises at least one of a name of the first host, identifiers of networks attached to the NIC, a boot protocol, or a quality of service.

5. The method of claim 3, wherein the configuration data associated with the NIC comprises bonding information to one of a slave NIC or a master NIC.

6. The method of claim 3, wherein the template record further comprises at least one of a power management parameter or a safety parameter to configure the first host.

7. The method of claim 1, further comprising:
editing the template record before configuring the second host.

8. An apparatus comprising:
a storage device; and
a processing device, communicatively coupled to the storage device, to:
receive, by a management server associated with the processing device, a network configuration data of a first host, wherein the first host is associated with a network segment identified by a network identifier, and wherein the network segment is a part of a cluster identified by a cluster identifier;
store the network configuration data in a template record;
receive a request to configure a second host;
determine that the second host is allowed to join the network segment in view of the cluster identifier;
configure the second host using the template record; and
join the second host to the network segment.

9. The apparatus of claim 8, wherein the network identifier comprises an alpha-numeral string.

10. The apparatus of claim 8, wherein the network configuration data stored in the template record comprises a configuration data associated with a network interface card (NIC) of the first host.

11. The apparatus of claim 10, wherein the configuration data associated with the NIC comprises at least one of a name of the first host, identifiers of networks attached to the NIC, a boot protocol, or a quality of service.

12. The apparatus of claim 10, wherein the configuration data associated with the NIC comprises bonding information to one of a slave NIC or a master NIC.

13. The apparatus of claim 10, wherein the template record further comprises at least one of a power management parameter or a safety parameter to configure the first host.

14. The apparatus of claim 8, wherein the processing device is further to edit the template record before to configure the second host.

15. A non-transitory computer readable storage medium comprising instructions that, when executed by a processing device, cause the processing device to:
- receive, by a management server, a network configuration data of a first host, wherein the first host is associated with a network segment identified by a network identifier, and wherein the network segment is a part of a cluster identified by a cluster identifier;
- store the network configuration data in a template record;
- receive a request to configure a second host;
- determine that the second host is allowed to join the network segment in view of the cluster identifier;
- configure, by the processing device of the management server, the second host using the template record; and
- join the second host to the network segment.

16. The non-transitory computer readable storage medium of claim 15, wherein the network identifier comprises an alpha-numeral string.

17. The non-transitory computer readable storage medium of claim 15, wherein the network configuration data stored in the template record comprises a configuration data associated with a network interface card (NIC) of the first host.

18. The non-transitory computer readable storage medium of claim 17, wherein the configuration data associated with the NIC comprises at least one of a name of the first host, identifiers of networks attached to the NIC, a boot protocol, or a quality of service.

19. The non-transitory computer readable storage medium of claim 17, wherein the template record further comprises at least one of a power management parameter or a safety parameter to configure the first host.

20. The non-transitory computer readable storage medium of claim 15, wherein the processing device is further to:
- edit the template record before configuring the second host.

\* \* \* \* \*